ial Patent [19] [11] 3,982,024

Oneto [45] Sept. 21, 1976

[54] PRESERVATION OF ALCOHOLIC BEVERAGES

[76] Inventor: Miguel Maximo Oneto, Araoz 2260, Buenos Aires, Argentina

[22] Filed: June 23, 1972

[21] Appl. No.: 265,476

[30] Foreign Application Priority Data
June 25, 1971  Argentina ............................ 236460
May 15, 1972  Argentina ............................ 242010
May 15, 1972  Argentina ............................ 242011

[52] U.S. Cl. .................................... 426/15; 426/11; 426/16; 426/330; 426/475; 426/477; 426/490
[51] Int. Cl.² ..................... C12G 1/00; C12C 11/04
[58] Field of Search ................... 99/35, 31, 48, 155; 426/11, 15, 16, 311, 312, 330, 490, 495

[56] References Cited
UNITED STATES PATENTS
1,619,016  3/1927  Duclaux .................................. 99/48
2,047,935  7/1936  Beal et al. ............................. 99/155
2,139,408  12/1938  Heuser .............................. 99/35 X

*Primary Examiner*—David M. Naff
*Attorney, Agent, or Firm*—Milton Osheroff

[57] ABSTRACT

Alcoholic beverages such as beer are preserved without pasteurization by mechanically removing microorganisms from the beverage and by carrying out the removing of microorganisms and all subsequent treatment of the beverage including bottling and sealing in a circuit free of air.

10 Claims, No Drawings

PRESERVATION OF ALCOHOLIC BEVERAGES

The present invention has to do with an improved method for preserving alcoholic beverages obtained by fermenting of sugars which eliminates the conventional method of final pasteurization for the purpose of sterilizing the product.

Based on the principle that from the alcoholic fermentation of raw materials containing glucose or others which contain starch, which can also be fermented, as a result of their opening up we obtain, in addition to ethyl alcohol, acids and by-products which provide the organoleptic characteristics of the various types of alcoholic beverages. We refer in particular to the products derived from the alcoholic fermentation of the must of the apple and pear and of the must prepared with germinated barley, hops, yeast and drinking water, commonly called ciders and beers, respectively.

The low percentage of alcohol contained in these products is due naturally to the small quantity of sugar in the raw material. When they are prepared careful attention must be given to prevent other fermentations occurring at the same time which spoil the product. Despite this, independently of the alcohol there are also produced acids, esters, etc., which, paradoxically, help the final product if they are in the appropriate quantity.

In this way one prepares the basic raw material which is then used in the production of bottled ciders and beers for human consumption. In actual practice every industry assigns a particular name to this. We call it "fermentation juice". All of them, as we have seen, have a low degree of alcohol and lack or only have a small percentage of sugar, with acids and by-products of the fermentation and, most of them, individual characteristics of the raw material used.

These "fermentation juices", after they are clarified and filtered, are shipped to the bottling plants where the manufacturer proceeds to use them to make various mixtures and the admixtures which the health regulations of each country permit, for the purpose of obtaining the final consumer product, i.e., cider, beer or similar products.

It is obvious that because of the conditions described the final bottled product, despite careful preparation, will retain a quantity of microorganisms which in the course of time will exert their effect changing the product, influencing its organoleptic characteristics to the point of making it unfit for consumption. When the product becomes muddy (turbid) this is the first visible phase of change and in practice the product is then referred to as "sick or diseased". Up to the present time only one method has been found and used to prevent these results and this is pasteurization of the bottled product intended for consumption for the purpose of sterilizing it and eliminating all of the microorganisms producing the sickness of the product. As we shall see, however, this always involved uncertain results.

In the particular case of cider or beer the fermentation juices cannot be kept for a long period of time after obtention because of their low alcoholic content and this facilitates the possibility of the product becoming diseased and therefore they are quickly placed into containers and pasteurized to inhibit, by pasteurization, the microorganisms causing the disease.

A classical way of preserving as well as curing the fermentation juices when it is noticed that microorganisms have developed in them which produce these corruptions and which is called fermentation juice with "start of disease" is to treat them with sulphurous anhydride which paralyzes the action of the microorganisms which are then removed by filtration. This means that the result is obtained by the combined action of two factors, one of which is chemical (sulphurous anhydride) and other physical (filtering). Experience has shown that in order to prevent this fermentation juice from becoming corrupt again or from contaminating with microorganisms producing sicknesses it is essential to keep it in the absolute absence of air. It should be kept in mind that air is a determining factor in the majority of the diseases of the fermentation juice because of the oxidations which air facilitates.

One of the basic difficulties in preventing contamination of the fermentation juices through contact with air is due to the evaporation which occurs in them in the recipients which contain them which, generally, are wooden vats, resulting in the need, as a first measure, to continuously refill these vats.

In order to obtain less evaporation, most of the stores have replaced the wooden vats with stone recipients, but vacuums still occur from changes in temperature, pressure, etc., which facilitate the evaporation of the product.

From what has been stated we can see that, despite all of the precautions which are taken in the preparation of the final consumer product, such as ciders and beers, and in accordance with the recommendations set forth by the health regulations of most of the countries, before the bottled and tapped product can be released to the consumer market it must be subjected to a final stage of pasteurization for the purpose of sterilizing the product and thus prevent change occurring in it from contamination.

Although there is no doubt that the pasteurization inhibits the microorganisms which produce the sicknesses in the final consumer product, by sterilization, it is no less certain that this makes the process more expensive since it adds an additional stage. This stage involves a considerable expense because of the cost of the elements necessary: boiler and pasteurizer, which depends, of course, on the number of bottles prepared, and expenses for the maintenance and movement, losses of bottles which break. It should be taken into account that the product enters the pasteurizer cold with two atmospheres of carbon dioxide and in a brief period of time it reaches the pasteurization temperature in which its inside pressure has been multiplied and the glass had to support a sudden change. This results in unavoidable breakage of the container with the consequent loss of the liquid, as well as losses arising from inappropriate closing or adjusting of the corks. These losses have to be added to the production costs and, as we see, they are quite high.

In the method of the present invention it has been found that, by treating the fermentation juice at low temperature and in a closed circuit free of air, it is possible to obtain a final consumer product which is free of microorganisms which cause such sicknesses. This treatment consists in separating from the fermentation juice the microorganisms which produce the diseases and/or the suspended materials which contain the microorganisms which produce the disease and then in continuing the treatment of the fermentation juice until it has been bottled and sealed in a closed circuit free of air.

It has been found that the low temperature is a physical factor which facilitates the possibility of separation of the microorganisms producing the diseases since it tends to paralyze their activity. This separation can be accomplished through any method capable of retaining the microorganisms and the suspended materials, particularly those in fine suspension, such as bacteria, yeast and their spored forms. This can be achieved by perfect filtration in its multiple possibilities, such as: filtration by centrifugation, various filtering beds or strata in the quantity of earths which industry continuously produces, vacuum filtering, and in particular those filtering systems of a continuous nature.

In this way we extract the microorganisms separately or in colonies from the medium and also those which can be trapped or enclosed in suspended microparticules which, when they become loose and pass into the fermentation juice, are responsible for the disease of the final consumer product.

In what follows we shall give some examples of the application of the procedure of the present invention in the methods for preparing ciders, beers or the like.

EXAMPLE 1

In all of what follows and which is claimed further on, it should be understood that the term "cider" involves every alcoholic beverage resulting from the fermentation of the juice of fresh apples or mixed with up to 10% pear juice. This term also encompasses the product of this fermented juice and conveniently referred to, in order to distinguish it from the final product, "raw material cider", which the fractionator mixes appropriately as desired, adding acids (citric or tartaric) and the necessary amount of sugar, filtering, cooling, saturating with carbon dioxide, bottling, corking, pasteurizing, labelling and selling as cider.

The conventional methods for obtaining this alcoholic beverage has a common point of departure consisting in the appropriate selection of the cider apples. To achieve this we mix different types of apples (and pears), acids, sweets, etc., so that the sugar content and the acidity of the juice comply with preestablished criteria as much as possible.

Once the raw material has been selected and cleaned completely, we proceed to obtain the must, basically by crushing and pressing. According to the particular case we add or do not add yeast for obtaining greater fermentation. After the fermentation has been completed and after sufficient time has elapsed for decanting (racking), the filtering is carried out resulting in the obtention of the raw material cider. The characteristics of this product depend upon the raw material from which it was prepared, for which reason the "fractionator" mixes them up to obtain the variety which is customary for him in his bottle. After this has been done he proceeds to add a sufficient amount of said acids and then sucrose or sugar. After filtering, the product is cooled at an appropriate temperature and is then saturated with carbon dioxide. Finally it is placed in the container, sealed, pasteurized and shipped out for consumption as cider.

In accordance with a preferred form of the procedure of the present invention, after the fermentation juice is carbonated it is fed in a closed circuit free of air and treated to separate (remove) microorganisms and suspended materials. The juice which has been treated in this way is fed to the bottle-filling machinery still through the closed circuit free of air, where the cider is bottled and sealed. In this way the storage of the cider can be extended over an enormous period of time, as shown by the tests carried out in which it was possible to determine the inalterability of the cider over periods of up to seven years.

EXAMPLE 2

Similarly to the conventional methods, in order to obtain cider we proceed with the proper selection of the cider apples, carrying out the mixing of the different types of apples (and pears), so that the sugar content and the acidity of the juice comply with preestablished criteria as much as possible.

Once the raw material has been selected and cleaned completely, we proceed to obtain the must, basically by crushing and pressing. According to the particular case, we add or do not add yeast for obtaining greater fermentation. After the fermentation has been completed and after sufficient time has elapsed for decanting (racking), the filtering is carried out resulting in the obtention of the raw material cider. The characteristics of this product depend upon the raw material from which it was prepared, for which reason the "fractionator" mixes them up to obtain the variety which is customary for him in his bottle. After this has been done he proceeds to add a sufficient amount of sucrose or sugar and necessary acids until he has obtained what is called in the trade the cider juice. This juice is cooled at an appropriate temperature below 3°C. and then, in accordance with the improvement introduced by the present invention, it is placed into a closed circuit free of air and treated for the purpose of removing from it the microorganisms and suspended materials, upon which, still in the closed circuit and free of air, it is brought to the carbonization stage where the juice is saturated with carbon dioxide, and from there it finally passes on to the bottling equipment, still in the closed circuit free of air, and it is put into the bottle which is then sealed, the cider thus being containerized.

By means of the improvement introduced by the present invention we obtain the elimination of the need for pasteurization of the cider, either in the bottling circuit or in the bottle itself. The tests which have been conducted with the procedure which includes the improvement of the present invention have shown the inalterability of the product during a period of time of up to seven years.

EXAMPLE 3

The beers are prepared in the conventional manner according to the type which one wishes to obtain and in accordance with the standards in effect. After they have been prepared, the beers are placed into tanks made of stainless steel or iron. The inside of these tanks is enameled or painted with a special resistant paint. These tanks commonly hold a capacity of 25,000 liters and are kept at low temperature when they are being stored awaiting bottling.

The fractioning is done at the place of origin, or, when this is done somewhere else, it is shipped in tanks of 10,000 to 25,000 liters at room temperature for preservation. The tanks are of enameled or painted iron. From there they are transferred to the vats of identical material for their fractioning, always keeping at room temperature.

For bottling purposes the beer is sent to the gasifier or carbonator at a temperature of 6°C. so that it absorbs better the carbon dioxide which is added to it at pressure of two atmospheres. After it is carbonated, by means of a horizontal impeller pump it is sent to the filling equipment.

The reason for the use of the impeller (pressure) pump is that in order to prevent the foam and the beer from flowing slowly into the tank of the filling machine it is carried at equal pressure all with carbon dioxide or against pressure or with air passed by sterilized carbon filter, produced by compressors of great capacity and low pressure, balancing the pressures with those of the beer foam.

In accordance with a preferred form for carrying out the procedure of the present invention, after the beer has been carbonated it is fed in a closed circuit free of air and treated to remove microorganisms and suspended materials. The beer which has been treated in this way is fed to the bottle-filling machinery, still through the closed circuit free of air, where the beer is bottled and sealed.

This stage of separation of the microorganisms and suspended materials can be done by any method capable of retaining microorganisms and the suspended materials, particularly those in fine suspension such as bacteria, yeast and their spored forms. This can be achieved by perfect filtration in its multiple possibilities, such as: filtration by centrifugation, various filter beds or strata in the quantity of earths which industry produces continuously, vacuum filtering, and in particular those filtering systems of a continued nature.

In this way we extract the microorganisms separately or in colonies from the medium and also those which can be trapped or enclosed in suspended microparticles which, when they become loose and pass to the medium, are responsible for the turbidity and acetification of the beer.

The stage of separation (removal) described previously must be carried out after the carbonizing of the beer, in a closed circuit, and before the beer is placed in the filling machine. As the result of the medium (environment) in which it is done, this filtering is carried out at low temperature, at pressure, in acid medium and in the presence of carbon dioxide, thus easily eliminating all of the yeast and microorganisms existing in the beer, leaving it completely sterile to continue through the same closed circuit to where it is bottled and closed, thus eliminating the need to pasteurize it. Similar results can be obtained if the separation stage is carried out prior to placement of the beer into the gasifier or carbonator, as long as the process is continued with the closed circuit free of air up to the time the beer is bottled and hermetically sealed.

The experiments showed that after four years no change in the content occurred.

I claim:

1. A method for the preservation of alcoholic beverages from a fermentation juice of at least one neutral fermentable sugar comprising the steps of mechanically removing from said beverage the microorganisms which cause disease in said beverage and any suspended material containing such organisms, and subsequently bottling and sealing said beverage, the step of removing said microorganisms and all subsequent treatment of the beverage including its bottling and sealing being done in a circuit free of air.

2. A method according to claim 1, wherein the beverage is maintained at a low temperature at least during the step of removing the microorganisms.

3. A method according to claim 1, wherein the beverage is carbonated prior to the removal of the microorganisms.

4. A method according to claim 1, wherein the beverage is carbonated subsequent to the removal of the microorganisms.

5. A method according to claim 1, wherein the microorganisms are removed from the beverage by filtration.

6. A method according to claim 2, wherein the microorganisms are removed from the beverage by filtration.

7. A method according to claim 6, wherein the beverage is carbonated prior to the removal of the microorganisms.

8. A method according to claim 6, wherein the beverage is carbonated subsequent to the removal of the microorganisms.

9. A method according to claim 1, wherein the fermentation juice comprises apple cider.

10. A method according to claim 1, wherein the fermentation juice comprises beer.

* * * * *